(12) United States Patent
Bradfield

(10) Patent No.: US 8,546,983 B2
(45) Date of Patent: Oct. 1, 2013

(54) SPLIT DRAIN SYSTEM AND METHOD FOR AN ELECTRIC MACHINE MODULE

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 254 days.

(21) Appl. No.: 12/904,848

(22) Filed: Oct. 14, 2010

(65) Prior Publication Data

US 2012/0091834 A1    Apr. 19, 2012

(51) Int. Cl.
*H02K 9/19* (2006.01)
*H02K 9/193* (2006.01)
*H02K 5/20* (2006.01)

(52) U.S. Cl.
USPC .............................. 310/54; 310/57; 310/60 A

(58) Field of Classification Search
USPC .............................. 310/54, 57, 58, 60 R, 60 A
IPC ..................................... H02K 9/19, 9/193, 5/20
See application file for complete search history.

(56) References Cited

U.S. PATENT DOCUMENTS

| | | | | |
|---|---|---|---|---|
| 3,727,085 | A | * | 4/1973 | Goetz et al. .................... 310/54 |
| 4,472,649 | A | | 9/1984 | Namba |
| 5,081,382 | A | | 1/1992 | Collings et al. |
| 5,180,004 | A | | 1/1993 | Nguyen |
| 5,207,121 | A | | 5/1993 | Bien |
| 5,220,233 | A | * | 6/1993 | Birch et al. .................... 310/54 |
| 5,372,213 | A | | 12/1994 | Hasebe et al. |
| 5,965,965 | A | | 10/1999 | Umeda et al. |
| 6,011,332 | A | | 1/2000 | Umeda et al. |
| 6,069,424 | A | | 5/2000 | Colello et al. |
| 6,097,130 | A | | 8/2000 | Umeda et al. |
| 6,147,430 | A | | 11/2000 | Kusase et al. |
| 6,147,432 | A | | 11/2000 | Kusase et al. |
| 6,173,758 | B1 | | 1/2001 | Ward et al. |
| 6,181,043 | B1 | | 1/2001 | Kusase et al. |
| 6,208,060 | B1 | | 3/2001 | Kusase et al. |
| 6,232,687 | B1 | | 5/2001 | Hollenbeck et al. |
| 6,242,836 | B1 | | 6/2001 | Ishida et al. |
| 6,291,918 | B1 | | 9/2001 | Umeda et al. |
| 6,313,559 | B1 | | 11/2001 | Kusase et al. |
| 6,333,573 | B1 | | 12/2001 | Nakamura |

(Continued)

FOREIGN PATENT DOCUMENTS

| | | |
|---|---|---|
| EP | 2109206 A1 | 10/2009 |
| JP | 2002-345210 A | 11/2002 |
| JP | 2005-229671 A | 8/2005 |
| JP | 2009-254205 A | 10/2009 |

OTHER PUBLICATIONS

International Search Report completed Apr. 19, 2012.

(Continued)

*Primary Examiner* — Tran Nguyen
*Assistant Examiner* — Michael Andrews
(74) *Attorney, Agent, or Firm* — Greenberg Traurig LLP

(57) ABSTRACT

Embodiments of the invention provide an electric machine module including module housing with an inner wall and at least one end cap. The module can at least partially define a machine cavity. The electric machine module can also include at least two drain holes positioned substantially circumferentially apart from one another and extending through a lower portion of the module housing. The at least two drain holes can provide gravity-fed fluid pathways out of the machine cavity.

1 Claim, 3 Drawing Sheets

(56) References Cited

U.S. PATENT DOCUMENTS

| | | |
|---|---|---|
| 6,335,583 B1 | 1/2002 | Kusase et al. |
| 6,346,758 B1 | 2/2002 | Nakamura |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,515,392 B2 | 2/2003 | Ooiwa |
| 6,522,043 B2 | 2/2003 | Masegi |
| 6,559,572 B2 | 5/2003 | Nakamura |
| 6,579,202 B2 | 6/2003 | El-Antably et al. |
| 6,770,999 B2 | 8/2004 | Sakurai |
| 6,897,594 B2 | 5/2005 | Ichikawa et al. |
| 6,998,749 B2 | 2/2006 | Wada et al. |
| 7,002,267 B2 | 2/2006 | Raszkowski et al. |
| 7,157,818 B2 * | 1/2007 | Jones .................. 310/60 R |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,591,147 B2 | 9/2009 | Masoudipour et al. |
| 7,615,903 B2 | 11/2009 | Holmes et al. |
| 7,615,951 B2 | 11/2009 | Son et al. |
| 7,667,359 B2 | 2/2010 | Lee et al. |
| 2003/0062780 A1 | 4/2003 | Kaneko |
| 2004/0036367 A1 | 2/2004 | Denton et al. |
| 2010/0033040 A1 * | 2/2010 | Wakita .................. 310/54 |

OTHER PUBLICATIONS

Griffith, Travis, et al., Advances in Oil Mist Lubrication for Electric Motors, Dec. 1998, pp. 1-6.

* cited by examiner

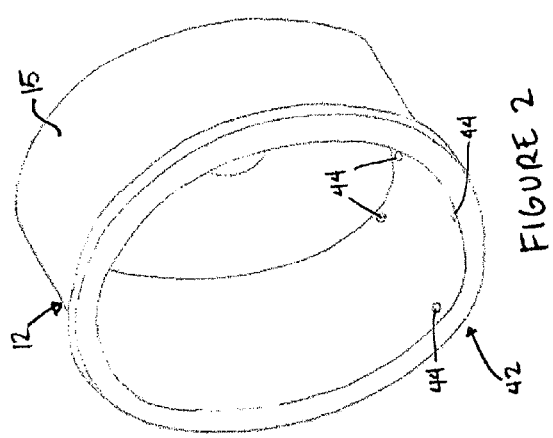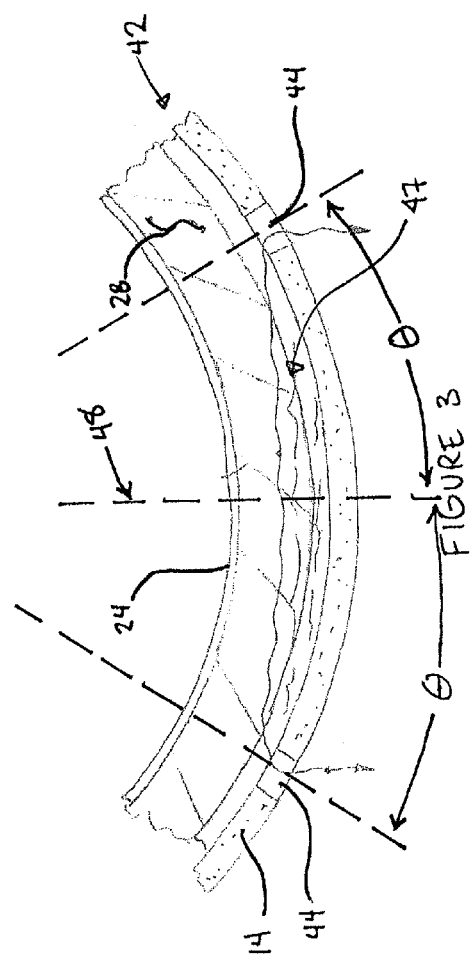

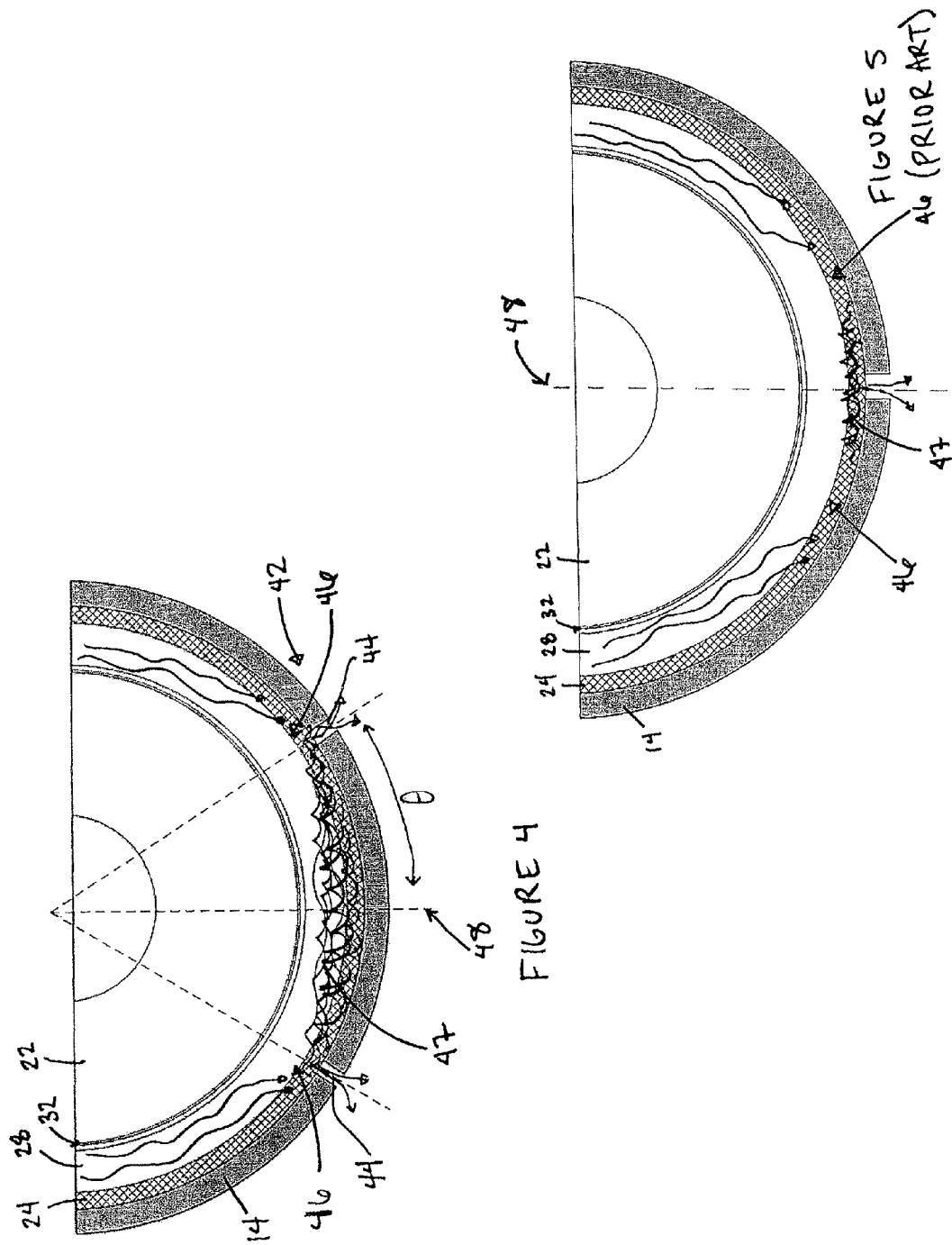

SPLIT DRAIN SYSTEM AND METHOD FOR AN ELECTRIC MACHINE MODULE

BACKGROUND

Conventional methods for cooling an electric machine include passing a coolant around an outer perimeter of the electric machine inside of a cooling jacket. The coolant extracts heat from a stator of the electric machine. In some machine designs, the level of heat removal is increased by spraying coolant from the cooling jacket directly onto end turns of the stator. Gravity can drain the sprayed coolant toward the bottom of the electric machine's housing and a drain hole is often located near the bottom of the housing to exhaust the coolant. Typically, the drain is located at the geometric bottom center of the housing.

When properly sized for gravity-fed drainage, however, the typical drain location does not allow the spent coolant to substantially pool at the bottom of the housing. As a result, lower regions of the stator end turns can overheat. In addition, if the electric machine is tipped, excessive amounts of the coolant can pool within the housing around the electric machine. The pooled coolant can flood an air gap between the electric machine stator and the electric machine rotor, causing adverse effects such as relatively large spin losses and/or thermal failure of the electric machine.

SUMMARY

Some embodiments of the invention provide an electric machine module including a module housing an inner wall and at least one end cap. The module housing can at least partially define a machine cavity and an electric machine can be at least partially enclosed within the machine cavity. The electric machine can include a stator and stator end turns. The electric machine module can also include at least two drain holes positioned substantially circumferentially apart from one another and extending through a lower portion of the module housing. The at least two drain holes can provide gravity-fed fluid pathways out of the machine cavity.

Some embodiments of the invention provide an electric machine module including a module housing with an inner wall and at least one end cap. The module housing can at least partially define a machine cavity and an electric machine can be at least partially enclosed within the machine cavity. The electric machine can include a stator and stator end turns. The electric machine module can also include a first drain hole extending through a lower portion of the module housing at a first angle from a vertical axis of the module housing in a positive direction, and a second drain hole extending through the lower portion of the module housing at the first angle from the vertical axis in a negative direction. At least one of the first drain hole and the second drain hole can provide a fluid pathway out of the machine cavity when the module housing is in a substantially upright position, when the module housing is rotated a second angle from the substantially upright position in a first direction, and when the module housing is rotated the second angle from the substantially upright position in a second direction opposite the first direction.

Some embodiments of the invention provide a method for cooling an electric machine module. The method can include providing a module housing including an inner wall, at least one end cap, a coolant jacket, and a vertical axis. The module housing can at least partially define a machine cavity and can at least partially enclose an electric machine within the machine cavity. The electric machine can include a stator including stator end turns and circumscribing a rotor, and a radial air gap defined between the stator and the rotor. The method can also include providing a plurality of coolant apertures extending through the inner wall which are in fluid communication with at least the machine cavity and the coolant jacket, introducing a coolant into the coolant jacket, and circulating the coolant from the coolant jacket through the plurality of coolant apertures and into the machine cavity. The method can further include positioning a first drain hole extending through a lower portion of the module housing at a first angle from the vertical axis in a positive direction, positioning a second drain hole extending through the lower portion of the module housing at the first angle from the vertical axis in a negative direction, and pooling the coolant between the first drain hole and the second drain hole at a pooled coolant level which contacts the stator end turns and remains below the radial air gap.

DESCRIPTION OF THE DRAWINGS

FIG. 2 is a perspective view of a module housing of an electric machine module according to another embodiment of the invention.

FIG. 3 is a partial side cross-sectional view of an electric machine module according to one embodiment of the invention.

FIG. 4 is another partial side cross-sectional view of an electric machine module according to one embodiment of the invention.

FIG. 5 is a partial side cross-sectional view of a conventional electric machine module.

DETAILED DESCRIPTION

Figure 1:
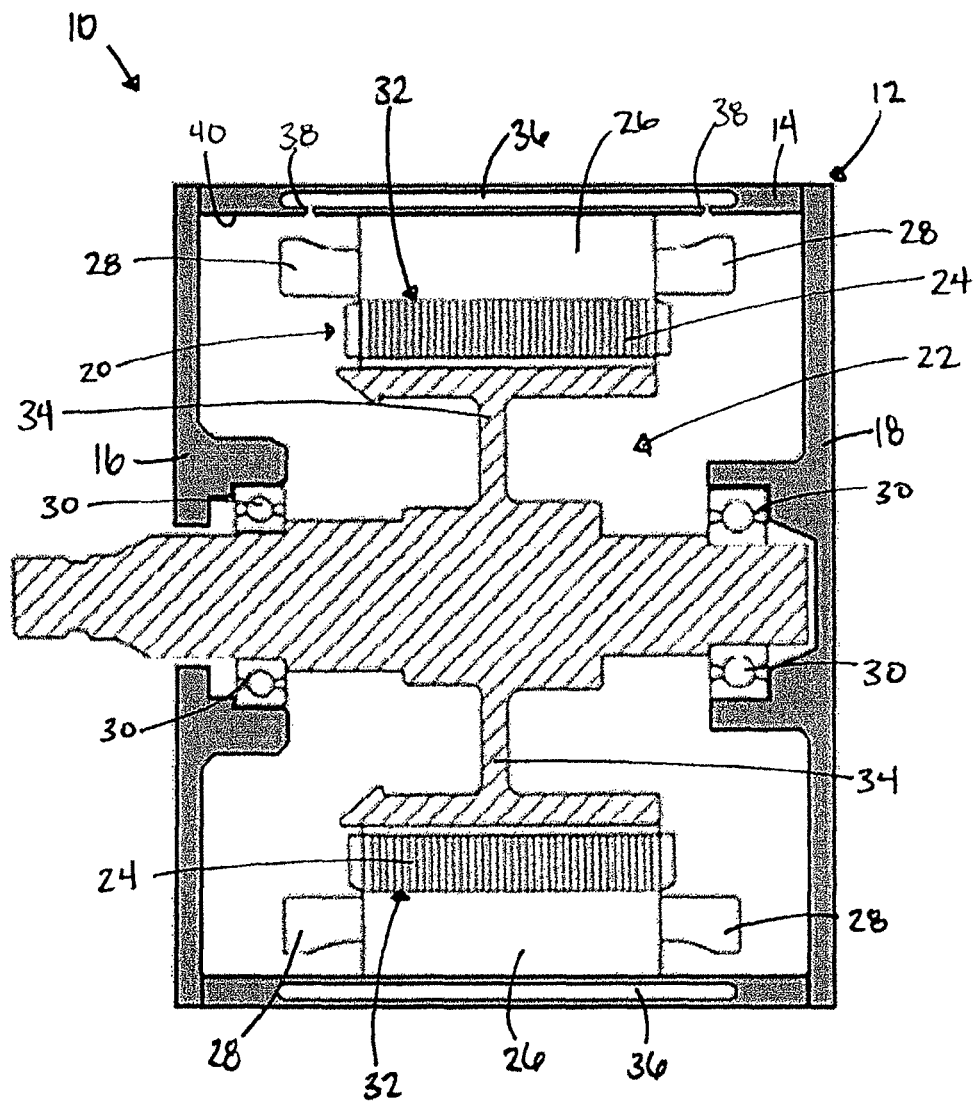
FIG. 1 is a front cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an electric machine module 10 according to one embodiment of the invention. The electric machine module 10 can include a module housing 12 comprising a sleeve member 14, a first end cap 16, and a second end cap 18. In one embodiment, the module housing 12 can be fabricated from cast aluminum. An electric machine 20 can be housed within a machine cavity 22 at least partially defined by the sleeve member 14 and the end caps 16, 18. For example, the sleeve member 14 and the end caps 16, 18 can be coupled via fasteners (not shown), or another suitable coupling manner, to enclose at least a portion of the electric machine 20 within the machine cavity 22. In some embodiments, the end caps 16, 18 can be identical parts. In other embodiments, the end caps 16, 18 can include different individual features. Also, in some embodiments, the housing 12 can comprise a substantially enclosed, substantially cylindrical canister 15 (as shown in FIG. 2) and a single end cap (not shown).

The electric machine 20 can include a rotor 24, a stator 26, stator end turns 28, and bearings 30, and can be disposed about a main output shaft 31. As shown in FIG. 1, the stator 26 can substantially circumscribe the rotor 24, and a radial air gap 32 can be defined between the rotor 24 and the stator 26. In some embodiments, the electric machine 20 can also include a rotor hub 34 or can have a "hub-less" design (not shown). The electric machine 20 can be, without limitation, an electric motor, such as a hybrid electric motor, an electric generator, or a vehicle alternator. In one embodiment, the electric machine 20 can be a High Voltage Hairpin (HVH) electric motor for use in a hybrid vehicle.

Components of the electric machine 20 such as, but not limited to, the rotor 24, the stator 26, and the stator end turns 28 can generate heat during operation of the electric machine 20. These components can be cooled to enhance the performance of and increase the lifespan of the electric machine 20.

In some embodiments, as shown in FIG. 1, the module housing 12 can include a coolant jacket 36. The coolant jacket 36 can substantially circumscribe or at least partially surround the stator 26 and can contain a coolant, such as oil (e.g., motor oil, transmission oil, etc.) or a similar liquid coolant fluid. The coolant jacket 36 can be in fluid communication with a fluid source (not shown) containing the coolant. The coolant can be pressurized as it enters the coolant jacket 36 so that is circulated through the coolant jacket 36. Heat energy generated by the electric machine 20 can be transferred to the coolant as it circulates through the coolant jacket 36, thus cooling the electric machine 20. In some embodiments, the coolant can be introduced into the coolant jacket 36 via a coolant inlet (not shown). In one embodiment, the coolant inlet can be positioned near a generally lower portion of the module housing 12.

In some embodiments, the coolant jacket 36 can be formed within the sleeve member 14 or the canister 15 of the module housing 12, where a radially innermost wall 40 of the sleeve member 14 or the canister 15 can substantially separate the coolant jacket 36 from the machine cavity 22. In other embodiments, the module housing 12 can include an internal sleeve member (not shown) and the coolant jacket 36 can be defined between the internal sleeve member and the sleeve member 14 or the canister 15 (i.e., so that the internal sleeve member forms the inner wall 40 substantially separating the coolant jacket 36 and the machine cavity 22). In such embodiments, for example, the internal sleeve member can be a stainless steel ring that the stator 26 is pressed into.

The coolant circulating through the coolant jacket 36 can be sprayed or dispersed into the machine cavity 22 from a plurality of coolant apertures 38 extending through the inner wall 40 of the module housing 12, as shown in FIG. 1. The plurality of coolant apertures 38 can be in fluid communication with, at least, the machine cavity 22 and the coolant jacket 36. The plurality of coolant apertures 38 can be axially located along the module housing 12 substantially adjacent to the stator end turns 28 (e.g., located near both axial ends of the module housing 12). As a result, the coolant can be dispersed from the coolant jacket 36, through the plurality of coolant apertures 38, at least partially onto and/or around the stator end turns 28. The dispersed coolant can receive heat energy from the stator end turns 28, which can result in cooling of the electric machine 20. In one embodiment, the plurality of coolant apertures 38 can be circumferentially located around a generally upper portion of the module housing 12. In another embodiment, the plurality of coolant apertures 38 can be circumferentially located substantially entirely around a circumference of the module housing 12. In other embodiments, the plurality of coolant apertures 38 can be positioned to disperse coolant throughout the machine cavity 22 through other methods, such as through coolant channels (not shown) in the end caps 16, 18.

The dispersed coolant can flow down toward a lower portion of the machine cavity 22 due to gravity. As the dispersed coolant flows downward, it can continue to remove heat energy from the electric machine components, such as, but not limited to, the stator 26, the rotor 24, the rotor hub 34, and the bearings 30. At least a portion of the dispersed coolant can then pool near the lower portion of the machine cavity 22. After pooling near the lower portion of the machine cavity 22, the coolant can still be substantially cooler than the electric machine components it is in contact with, such as the stator 26 and the stator end turns 28, and thus, can continue to remove heat energy from the stator 26 and/or the stator end turns 28.

In some embodiments, the module housing 12 can include a split drain system 42 to remove the pooled coolant from the machine cavity 22. As shown in FIG. 3, the split drain system 42 can include drain holes 44 extending through the housing 12 (i.e., through the sleeve member 14, the canister 15, the internal sleeve member, and/or the end caps 16, 18 in some embodiments). The drain holes 44 can provide gravity-fed fluid pathways out of the machine cavity 22. In one embodiment, at least two drain holes 44 can be located at or near either axial end of the module housing 12 (i.e., at least two drain holes 44 can be located near a first axial end and at least another two drain holes 44 can be located at a second axial end opposite the first axial end). The at least two drain holes 44 at each axial end can be located circumferentially apart from one another along the lower portion of the module housing 12, as shown in FIG. 2. For example, as shown in FIGS. 3 and 4, the two drain holes 44 can each be offset at an angle θ in a positive direction and a negative direction from a vertical axis 48 of the housing 12 (i.e., a first drain hole 44 is offset from the vertical axis 48 by the positive angle θ and a second drain hole 44 is offset from the vertical axis 48 by the negative angle θ). The angle θ can be greater than zero degrees and, in one embodiment, the angle θ can be about 35 degrees or less. In addition, in some embodiments (not shown), the first drain hole 44 can be offset from the vertical axis 48 in the positive direction by a first angle and the second drain hole 44 can be offset from the vertical axis in the negative direction by a second angle different from the first angle.

The drain holes 44 can be fluidly connected to an external cooler (e.g., a heat exchanger, radiator, etc.) so that the coolant exhausted from the module housing 12 can be cooled and cycled back to the coolant jacket 36 (e.g., through the coolant inlet). In some embodiments, a drain pan (not shown) can collect the coolant from the drain holes 44 and a conventional connection hose or similar can be coupled to a drain outlet of the drain pan to direct the coolant to the external cooler and/or a pump.

As shown in FIG. 4, the dispersed coolant can flow downward along the stator end turns 28, removing heat energy from the end turns 28, until gravity causes it to drip off (or run off) from the stator end turns 28 toward the bottom of the machine cavity 22. Conventional electric machine modules, as shown in FIG. 5, include a drain at the geometric bottom center of the machine housing. As shown in FIG. 5, a region 46 can exist between the run-off point of the coolant and a coolant pool 47 near the single drain, where the stator end turns 28 are not directly cooled by the coolant. In some applications, inadequate cooling of this region 46 (i.e., due to minimal contact with the coolant) can cause the stator end turns 28 to overheat. As shown in FIGS. 3 and 4, the split drain system 42 can allow additional coolant to pool within the machine cavity 22 (e.g., at least between the first drain hole 44 and the second drain hole 44). As a result, additional cooling can be gained through the use of the split drain system 42 compared to a single, central drain because a larger coolant pool 47 can allow more coolant in contact with the stator end turns 28. Further, as shown in FIG. 4, the split drain system 42 and resulting larger coolant pool 47 can reduce the region 46 where the stator end turns 28 are not in direct contact with the coolant, thus minimizing the risk of the stator end turns 28 overheating.

By being angularly and axially displaced, the drain holes 44 can allow for substantially normal functioning of the split drain system 42 if the electric machine 20 is tipped forward and backward or toward one side or another. In some embodiments, the drain holes 44 can be located axially inward closer to the stator 26 (e.g., than the axial ends of the module housing 12) in order to minimize the impact of side-to-side tipping of the electric machine 20 on coolant drainage.

In some embodiments, the angular displacement of the drain holes 44 (i.e., the magnitude of the angle θ) can be selected based on a size of the machine cavity 22, a desired amount of coolant pooling, and other factors, such as the applications for which the electric machine 20 is intended to be used and how much tipping would be anticipated in such applications. For example, the drain holes 44 can be circumferentially spaced apart from the vertical axis 48 to permit a coolant pool 47 deep enough to provide optimal cooling of at least some of the stator end turns 28, but shallow enough to not flood the radial air gap 32 during anticipated tipping (i.e., so that a depth or level of the coolant pool remains below the radial air gap 32).

In another example, the drain holes 44 can be displaced to permit a coolant pool 47 deep enough to provide optimal cooling of at least some of the stator end turns 28, permit substantially consistent drainage during anticipated tipping, and maintain the coolant pooling level below the air gap 32 over a range of tipping angles of the electric machine module 10, as shown in FIG. 4. In some embodiments, the anticipated tipping can be a range from a substantially upright position of the electric machine module 10 (i.e., zero degrees rotation) to a second angle or degree value from the substantially upright position in both a forward direction and a backward direction. Due to the two drain holes 44 being spaced circumferentially apart from one another and being substantially offset from the vertical axis 48, at least the first drain hole 44 can provide a fluid pathway for coolant draining (i.e., for the coolant to exit the machine cavity 22) when the electric machine module 10 is tipped or rotated in the forward direction up to the second angle from the substantially upright position so that the coolant pool level remains below the air gap 32. Similarly, at least the second drain hole 44 can provide a fluid pathway for coolant draining when the electric machine module 10 is tipped or rotated in the backward direction up to the second angle from the substantially upright position so that the coolant pool level remains below the air gap 32. When the electric machine module 10 is positioned in the substantially upright position, the first drain hole 44 and/or the second drain hole 44 can provide fluid pathways for coolant draining.

Also, in some embodiments, the angular displacement of the drain holes 44 can be based on operating temperature ranges of the electric machine 20. For example, in one embodiment, the split drain system 42 can function over substantially all operating temperature ranges of the electric machine 20, despite the impact the temperature may have on the viscosity and flow rates of the coolant.

In addition, in some embodiments, the diameter of each drain hole 44 can be selected based on a size of the machine cavity 22, a flow rate of coolant into the machine cavity 22, and/or other factors. In some embodiments, the diameter of each drain hole 44 can be between about 10 millimeters and about 30 millimeters.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. An electric machine module comprising:
  a module housing including an inner wall and at least one end cap, the module housing at least partially defining a machine cavity, the module housing including a vertical axis;
  an electric machine at least partially enclosed within the machine cavity, the electric machine including a stator and stator end turns;
  a first drain hole extending through a lower portion of the module housing and positioned at a first angle from the vertical axis in a counterclockwise direction; and
  a second drain hole extending through the lower portion of the module housing and positioned at the first angle from the vertical axis in a clockwise direction,
  at least one of the first drain hole and the second drain hole providing a gravity-fed fluid pathway out of the machine cavity when the module housing is rotated a second angle from the substantially upright position in a first direction, and when the module housing is rotated the second angle from the substantially upright position in a second direction opposite the first direction, wherein the first drain hole and the second drain hole are positioned substantially circumferentially away from the vertical axis along a lower portion of the module housing to permit pooling of a coolant within the machine cavity at least between the first drain hole and the second drain hole, at least one of the first drain hole and the second drain hole providing the gravity-fed fluid pathway for the coolant to exit the machine cavity and wherein the level of permitted pooling of coolant within the machine cavity substantially reaches the stator end turns which are located between the first drain hole and the second drain hole.

* * * * *